US006485390B2

(12) United States Patent
Inoue

(10) Patent No.: US 6,485,390 B2
(45) Date of Patent: Nov. 26, 2002

(54) TRANSFER FOR FOUR-WHEEL DRIVE VEHICLE

(75) Inventor: Toru Inoue, Aichi (JP)

(73) Assignee: Aisin Ai Co., Ltd., Nishio (JP)

( * ) Notice: Subject to any disclaimer, the term of this patent is extended or adjusted under 35 U.S.C. 154(b) by 62 days.

(21) Appl. No.: 09/796,558

(22) Filed: Mar. 2, 2001

(65) Prior Publication Data

US 2001/0019981 A1 Sep. 6, 2001

(30) Foreign Application Priority Data

Mar. 3, 2000 (JP) ....................................... 2000-058709
Feb. 26, 2001 (JP) ....................................... 2001-049586

(51) Int. Cl.[7] ................................................ F16H 3/44
(52) U.S. Cl. ....................................... 475/313; 475/295
(58) Field of Search ................................ 475/311, 313, 475/295, 300, 252, 248; 180/247

(56) References Cited

U.S. PATENT DOCUMENTS

| | | | | |
|---|---|---|---|---|
| 4,612,824 A | * | 9/1986 | Ruhle | 475/204 |
| 4,805,485 A | * | 2/1989 | Ida | 180/250 |
| 5,226,860 A | * | 7/1993 | Baxter et al. | 180/247 |
| 5,720,688 A | * | 2/1998 | Wilson et al. | 180/247 |
| 5,884,526 A | * | 3/1999 | Fogelberg | 192/82 P |
| 5,967,930 A | * | 10/1999 | Ahluwalia | 180/247 |
| 6,113,512 A | * | 9/2000 | Williams | 475/204 |
| 6,258,002 B1 | * | 7/2001 | Lippitsch | 180/247 |
| 6,283,890 B1 | * | 9/2001 | Schleuder et al. | 475/343 |
| 6,398,688 B2 | * | 6/2002 | Brown et al. | 180/247 |
| 6,405,822 B1 | * | 6/2002 | Lee | 180/247 |

* cited by examiner

*Primary Examiner*—Christopher P. Schwartz
*Assistant Examiner*—Benjamin A Pezzlo
(74) *Attorney, Agent, or Firm*—Burns, Doane, Swecker & Mathis, LLP

(57) ABSTRACT

A transfer for a four-wheel drive vehicle of simplified structure in which speed-reducing and center differential functions are implemented by a single planetary gear set includes an input shaft; a first output shaft disposed coaxially with respect to the input shaft; a ring gear which co-rotates with the input shaft; a first pinion meshed with the ring gear; a second pinion in mesh with the first pinion at all times; a carrier for axially supporting the first and second pinions; a sun gear which, by being slid, selectively meshes with the first pinion or the second pinion; a brake for locking the sun gear when the sun gear and the first pinion mesh (the low position of the transfer); a driving gear which meshes with the sun gear when the sun gear and the second pinion mesh (the high position of the transfer); a sleeve mounted on the first output shaft and shifted for engaging the driving gear with the first output shaft in the direction of rotation; a second output shaft disposed in parallel with the first output shaft; and a driven gear which co-rotates with the second output shaft and to which torque is transmitted from the driving gear via a chain.

13 Claims, 5 Drawing Sheets

TRANSFER FOR FOUR-WHEEL DRIVE VEHICLE

FIELD OF THE INVENTION

This invention relates a transfer for a four-wheel drive vehicle and, more particularly, to a planetary-gear-type transfer for a four-wheel drive vehicle.

BACKGROUND

FIG. 6 is a diagram of a gear train in a transfer for a four-wheel drive vehicle according to the prior art. This transfer includes a first planetary gear mechanism 60, i.e., an auxiliary speed-change unit, for exerting a speed-reducing effect, and a second planetary gear mechanism 61, i.e., a center differential, for implementing a center differential function.

SUMMARY OF THE DISCLOSURE

In the course of investigations toward the present invention the following problem has been encountered in the art.

With the conventional transfer of the kind described above, the two functions required by the transfer (namely the speed-reducing function and center differential function) are implemented by two planetary gear mechanisms. The result is a complicated structure as well as an increase in the weight and cost of the transfer.

Accordingly, an object of the present invention is to provide a transfer, the structure of which is simplified, for a four-wheel drive vehicle.

According to an aspect of the present invention, there is provided a transfer for a four-wheel drive vehicle, comprising: an input shaft; a first output shaft disposed coaxially with respect to the input shaft; a ring gear which co-rotates with the input shaft; a first pinion meshed with the ring gear; a second pinion in mesh with the first pinion at all times; a carrier, which co-rotates with the first output shaft, for axially supporting the first and second pinions; a sun gear, which is shifted axially of the first output shaft, for being selectively meshed with the first pinion or second pinion; a locking/unlocking means for locking the sun gear against movement; and a second output shaft, which is disposed in parallel with the first output shaft, for selectively transferring torque from the first output shaft or sun gear.

According to a second aspect, there is provided a driving gear disposed on the first output shaft rotatably in unison with or relative to the first output shaft, and the transfer may be provided with synchronizing means for causing a driving gear to co-rotate with the sun gear or the first output shaft to co-rotate.

According to a third aspect, there is provided a transfer for a four-wheel drive vehicle, comprising:

an input shaft;

a first output shaft disposed coaxially with respect to the input shaft;

a ring gear which co-rotates with the input shaft;

a first pinion meshed with the ring gear;

a second pinion in mesh with the first pinion at all times;

a carrier rotatably supporting the first and second pinions;

a sun gear, which extends axially of the first output shaft, for having one end thereof selectively meshed with the first pinion or the second pinion by the sun gear being slid axially of the first output shaft in response to an applied operation;

a brake capable of locking a second end of the sun gear when the first end of the sun gear is at a position where it will mesh with the first pinion;

a driving gear for meshing with the second end of the sun gear when the first end of the sun gear is at a position where it will mesh with the second pinion;

a sleeve mounted on the first output shaft so as to be capable of engaging with the first output shaft in a direction of rotation and of being shifted along the first output shaft axially thereof, the sleeve being shiftable so that the driving gear can be engaged with the first output shaft in the direction of rotation;

a second output shaft disposed in parallel with the first output shaft;

a driven gear, which is provided on the second output shaft so as to co-rotate therewith, for having power transmitted thereto from the driving gear.

In the transfer, when the transfer is in a high position, the sun gear is meshed with the second pinion and the driving gear, whereby torque is transmitted to the driving gear via the sun gear, and thence to the second output shaft; and when the transfer is in a low position, the sun gear is meshed with the first pinion and is fixed by the brake, and the driving gear is engaged with the first output shaft in the direction of rotation, whereby torque is transmitted to the driving gear via the first output shaft, and thence to the second output shaft.

Further, when the transfer is in the high position, the driving gear is engaged with the first output shaft in the direction of rotation, whereby the first and second output shafts can be placed in a directly connected state.

PREFERRED EMBODIMENTS

In terms of operation of the transfer, torque is transmitted to the first output shaft via the carrier. The sun gear, on the other hand, is shifted to the other side to mesh with the second pinion so that torque is transmitted to the second output shaft via the sun gear. This establishes the high position.

Further, torque is transmitted to the first output shaft via the carrier. The sun gear, on the other hand, is shifted to one side to mesh with the first pinion and is locked by the braking means so that torque is transmitted to the second output shaft via the first output shaft. This establishes the low position.

A difference between the rotational speeds of the front and rear axles connected to the first and second output shafts, respectively, is accommodated (i.e., absorbed) by a single planetary gear mechanism comprising a ring gear, a carrier, first and second pinions and a sun gear.

Further, in accordance with the present invention, the drive gear is engaged with the first output shaft with regard to the direction of rotation, e.g., by a sleeve, even in the high position. This makes it possible to provide a transfer in which the first and second output shafts can be placed in a directly connected state.

In accordance with the transfer of the present invention as described above, both the speed-reducing and center differential functions can be implemented by a single planetary gear mechanism. In other words, the present invention provides a transfer that is simple in structure, light in weight and low in cost.

Other features and advantages of the invention will be apparent from the following description taken in conjunction with the accompanying drawings, in which like reference characters designate the same or similar parts throughout the figures thereof.

BRIEF DESCRIPTION OF THE DRAWINGS

FIGS. 1A and 1B are gear train diagrams of a transfer for a four-wheel drive vehicle according to an embodiment of the present invention, in which FIG. 1A illustrates state of operation of the transfer in the high position and FIG. 2B the state of operation of the transfer in the low position;

PREFERRED EMBODIMENTS OF THE INVENTION

Preferred embodiments of the present invention will now be described.

In a first preferred embodiment of the invention, a first output shaft is connected to the rear-wheel side and a second output shaft is connected to the front-wheel side.

In this embodiment, the axial length of a first pinion is made greater than that of a second pinion, and the first pinion has teeth for meshing at both axial ends thereof, the teeth at both ends being spaced apart from each other. The first end (on the side of a main transmission) of the first pinion is capable of being meshed with a sun gear, and the second end of the first pinion is in mesh with the second pinion at all times.

In another embodiment, the axial length of the second pinion is made greater than that of the first pinion, and the second pinion has teeth for meshing at both axial ends thereof, the teeth at both ends being spaced apart from each other. The second end of the second pinion is capable of being meshed with the sun gear, and the first end of the second pinion is in mesh with the first pinion at all times.

In the preferred embodiments of the present invention, the meshing portions of the sun gear and of the first and second pinions are beveled.

DETAILED DESCRIPTION OF THE EMBODIMENTS

In order to further clarify the preferred embodiments set forth above, these embodiments will be described in greater detail with reference to the drawings.

Figure 1:
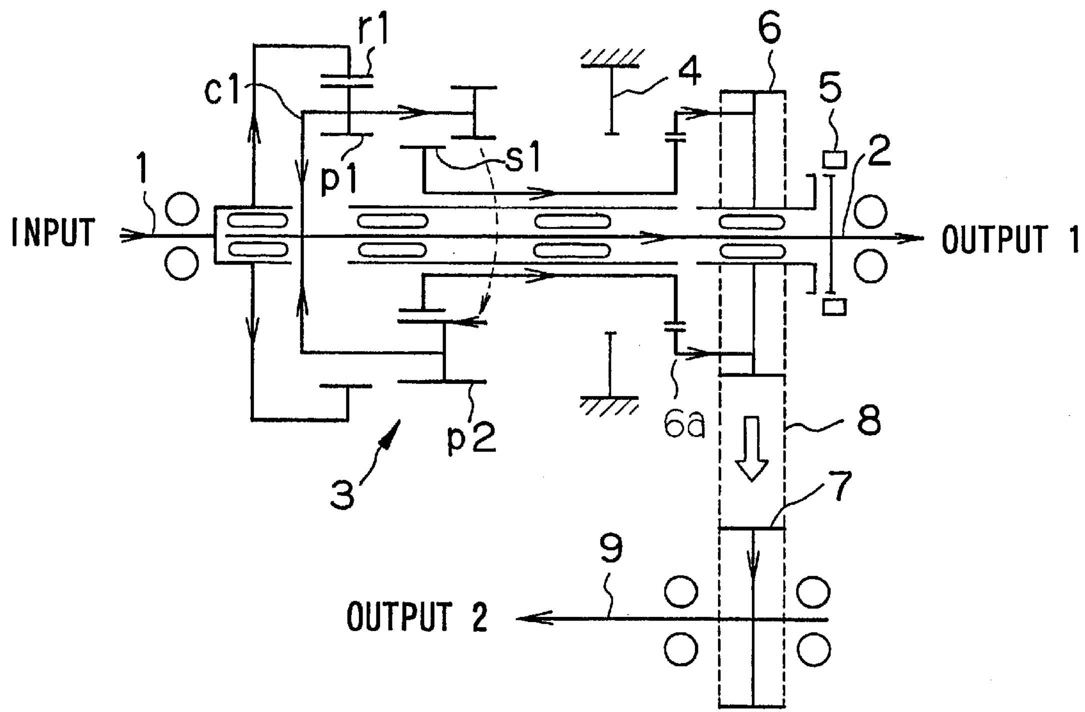
Figure 1:
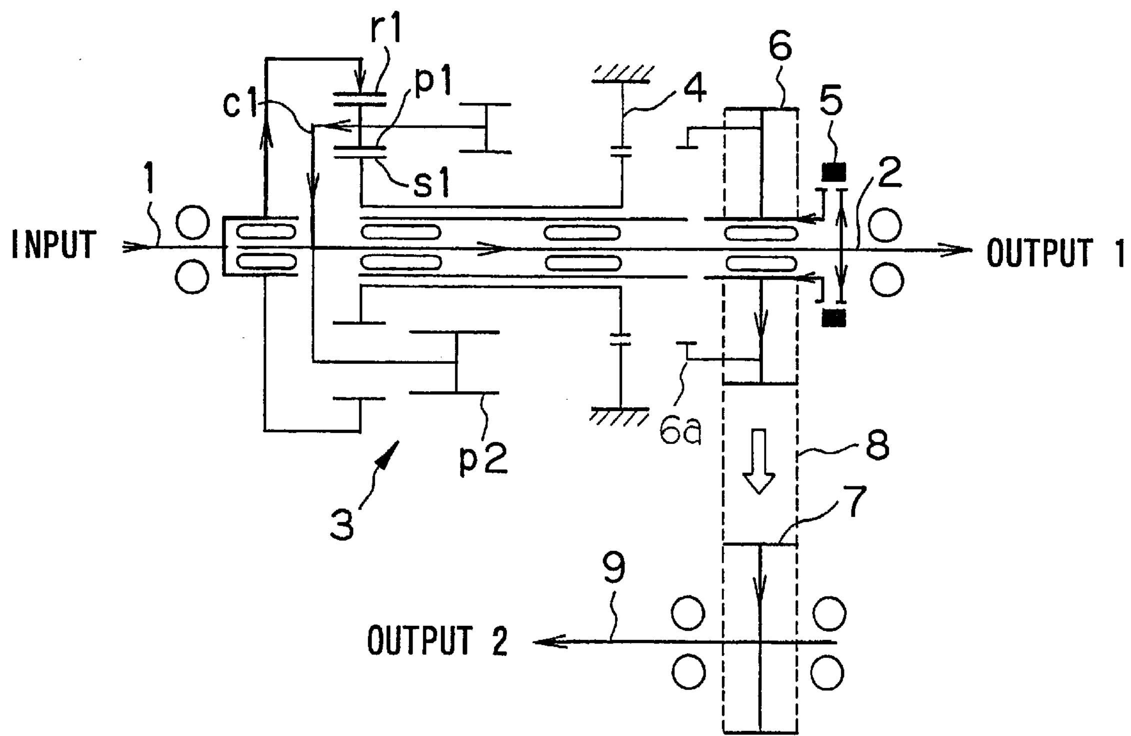
Figure 2:
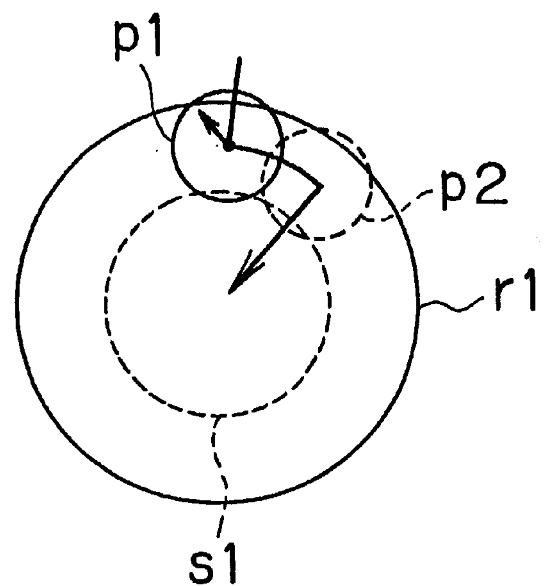
FIGS. 2A and 2B are diagrams showing the torque flow of a planetary gear mechanism in the transfer of this embodiment in the high and low positions, respectively.
Figure 2:
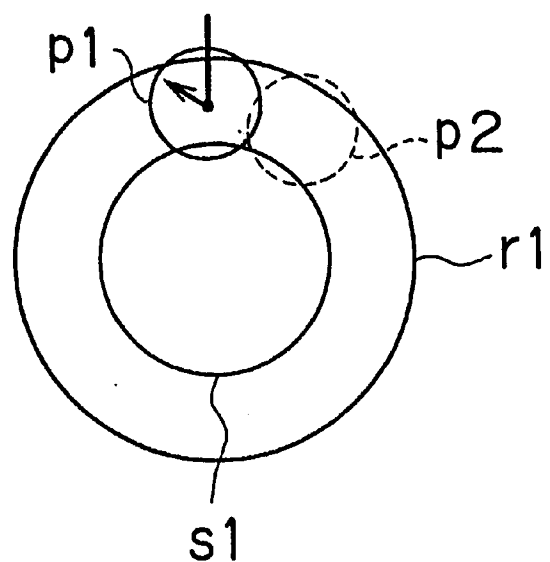

FIGS. 1A and 1B are gear train diagrams of a transfer for a four-wheel drive vehicle according to a first embodiment of the present invention, in which FIG. 1A illustrates the state of operation of the transfer in the high position and FIG. 2B the state of operation of t he transfer in the low position.

As shown in FIGS. 1A and 1B, a first output shaft 2 is disposed coaxially with respect to an input shaft 1 to which torque from a transmission (main transmission) is applied, and a second output shaft 9 is disposed in parallel with the first output shaft 2. A ring gear r1 which co-rotates (i.e., rotates in unison) with the input shaft 1 is disposed radially onternally of the first output shaft 2. A first end of the first pinion p1 is meshed with the ring gear r1. The first pinion pi extends toward the other side axially of the first output shaft 2 and has teeth at both axial ends thereof that are spaced apart from each other in the axial direction. A second pinion p2 is in mesh with a second end of the first pinion pi at all times. The first pinion p1 is formed to have an axial length greater than that of the second pinion p2. A carrier c1 is fixedly secured to a first end of the second pinion p2 so as to co-rotate therewith. The first and second pinions p1, p2 are axially supported by the carrier c1 and are capable of rotating freely relative to the carrier c1. A sun gear si is disposed on the first output shaft 2 inwardly of the first and second pinions p1, p2. The sun gear s1 extends along the first output shaft 2 in the axial direction. By performing an operation to slide the sun gear s1 along the first output shaft 2, the sun gear si is selectively meshed with the first end of the first pinion p1 or with the second pinion p2. The ring gear r1, the first and second pinions p1, p2, the sun gear s1 and the carrier cl make up a single planetary gear mechanism (i.e., a single planetary gear set) 3.

A brake (locking/unlocking means or unit) 4 is disposed on the outer side of the sun gear s1 at an intermediate portion thereof. When the first end of the sun gear s1 is at a position where it will mesh with the first pinion p1, the brake 4 is capable of fixing the second end of the sun gear s1 to the case.

A driving gear 6 is mounted on a second end of the first output shaft 2 so as to be capable of rotating selectively relative to or in unison with the first output shaft 2. The driving gear 6 has an integral ring gear 6*a* (as means for synchronizing with the sun gear s1). When the sun gear si is at a position where it meshes the second pinion p2, the driving gear 6 meshes (in sync) with the second end of the sun gear s1 via the ring gear 6*a*. A sleeve (synchronizing device) 5 is mounted on the second end of the first output shaft 2 so as to be capable of engaging the first output shaft 2 in the direction of rotation and of shifting in the axial direction of the first output shaft 2. When the sun gear s1 is at a position where it meshes with the first pinion p1, the sleeve 5 is shifted to engage the driving gear 6 with the first output shaft 2 in the direction of rotation, as shown in FIG. 1B.

A driven gear 7 is fixedly secured to the second output shaft 9 so as to co-rotate with the second output shaft 9. A chain 8 is wound upon and stretched between the driving gear 6 and the driven gear 7.

The operation of the transfer set forth above will now be described.

The arrows in FIGS. 1A and 1B indicate the flow of torque. Further, FIGS. 2A and 3A indicate the operating state of the planetary gear mechanism in the high position, and FIGS. 2B and 3B indicate the operating state of the planetary gear mechanism in the low position.

[High Position]

Operation of the transfer in the high position will be described first.

Figure 3:
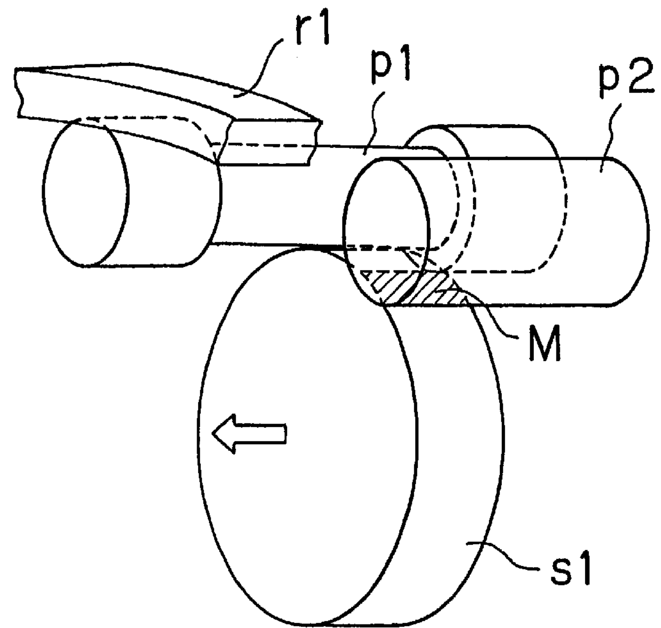
FIGS. 3A and 3B are diagrams illustrating state of operation of the planetary gear mechanism in the transfer in the high and low positions, respectively.
Figure 3:
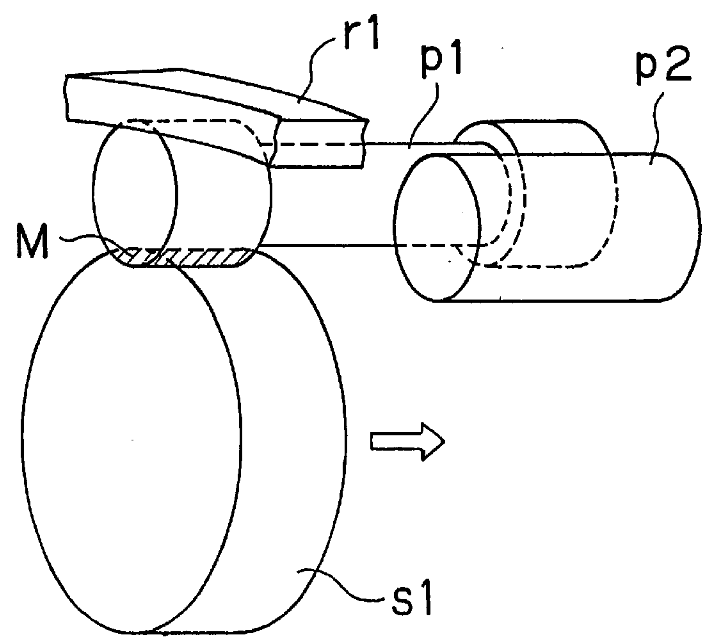

As shown in FIGS. 1A, 2A and 3A indicative of the high position, the sun gear sl has been shifted to the right in FIG. 1A, the first end of the sun gear sl is engaged with the second pinion p2, and the second end of the sun gear s1 is meshed with the driving gear 6. The brake 4 is in the released position. Accordingly, a torque transmitted from the transmission is transmitted to "OUTPUT 1", namely to the first output shaft 2, via the input shaft 1, ring gear r1, first pinion p1 and carrier c1, and to "OUTPUT 2", namely to the second output shaft 9, via the input shaft 1, ring gear r1, first pinion p1, second pinion p2, sun gear s1, driving gear 6, chain 8 and driven gear 7. It should be noted that the reduction gear ratio in the high position is 1. Further, the driving gear 6 can be engaged with the first output shaft 2 relative to the direction of rotation by the sleeve 5, whereby the first and second output shafts 2, 9 can be directly interconnected even when the transfer is in the high position.

[Low Position]

Operation of the transfer in the low position will be described next.

As shown in FIGS. 1B, 2B and 3B indicative of the low position, the sun gear s1 has been shifted to the left in FIG. 1B, the first end of the sun gear si is engaged with the first end of the first pinion p1, and the second end of the sun gear si is locked to the case by the brake 4. Accordingly, a torque transmitted from the transmission is transmitted to "OUTPUT 1", namely to the first output shaft 2, via the input shaft 1, ring gear r1, first pinion p1 and carrier c1, and to "OUTPUT 2", namely to the second output shaft 9, via the input shaft 1, ring gear r1, first pinion p1, carrier c1, first output shaft 2, sleeve 5, driving gear 6, chain 8 and driven gear 7. The reduction gear ratio in the low position is 1+Zs/Zr, where Zs represents the number of teeth of sun gear s1 and Zr the number of teeth of ring gear r1.

Figure 4:
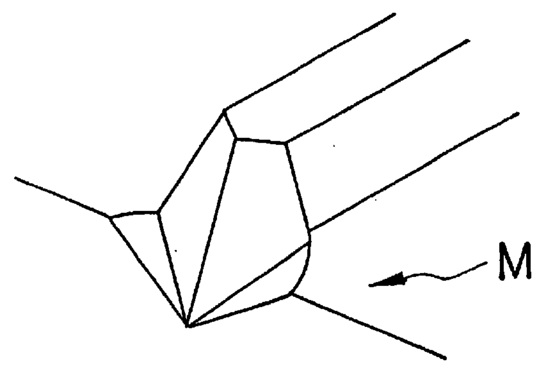
FIG. 4 is a diagram illustrating the ideal shape of meshing portions formed in the first and second pinions and sun gear of the transfer according to this embodiment.

FIG. 4 is a diagram illustrating the ideal shape of meshing portions of the first and second pinions p1, p2 and of the sun gear s1. With reference to FIGS. 3A, 3B, the first and second pinions p1, p2 mesh selectively with the sun gear s1 at a meshing portion M when the sun gear s1 is shifted. The meshing portion M of these pinions and the meshing portion M of the sun gear s1 which meshes with either of these pinions preferably are beveled so as to be composed of a plurality of conical surfaces that converge toward the distal end, as shown in FIG. 4.

A second embodiment of the invention will now be described. In principle, only the difference between this embodiment as the first embodiment set forth above will be discussed. Reference should be had to the foregoing embodiment for an understanding of components and functions that are common to both embodiments.

Figure 5:
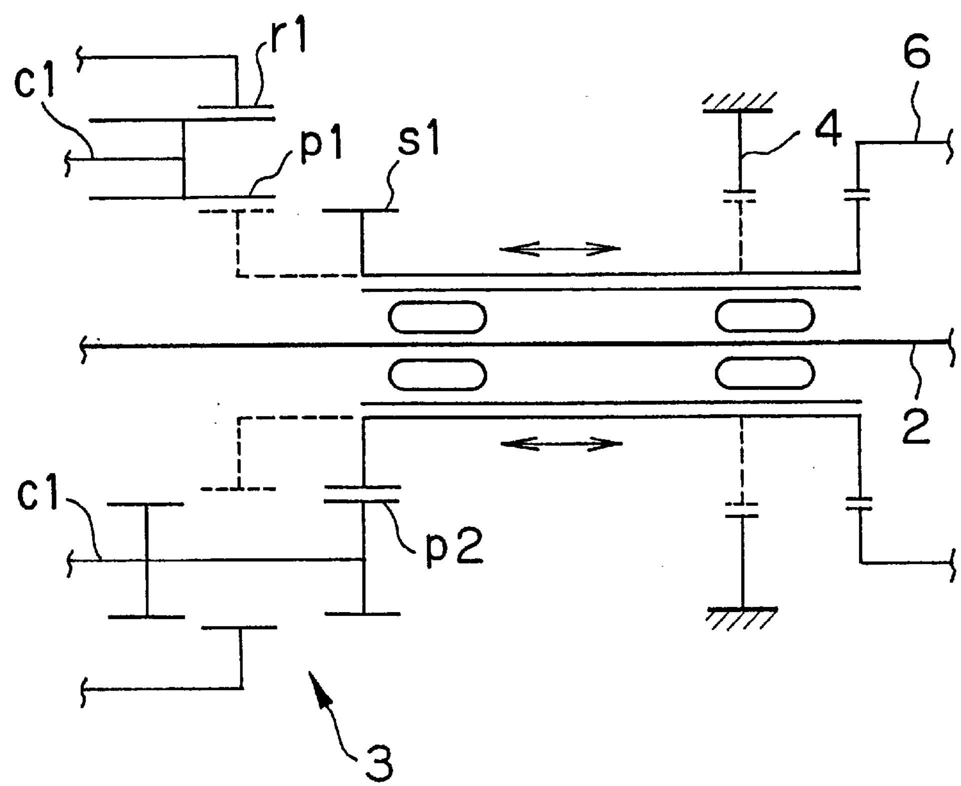
FIG. 5 is a gear train diagram showing the principal components of a transfer according to another embodiment of the present invention.
Figure 6:
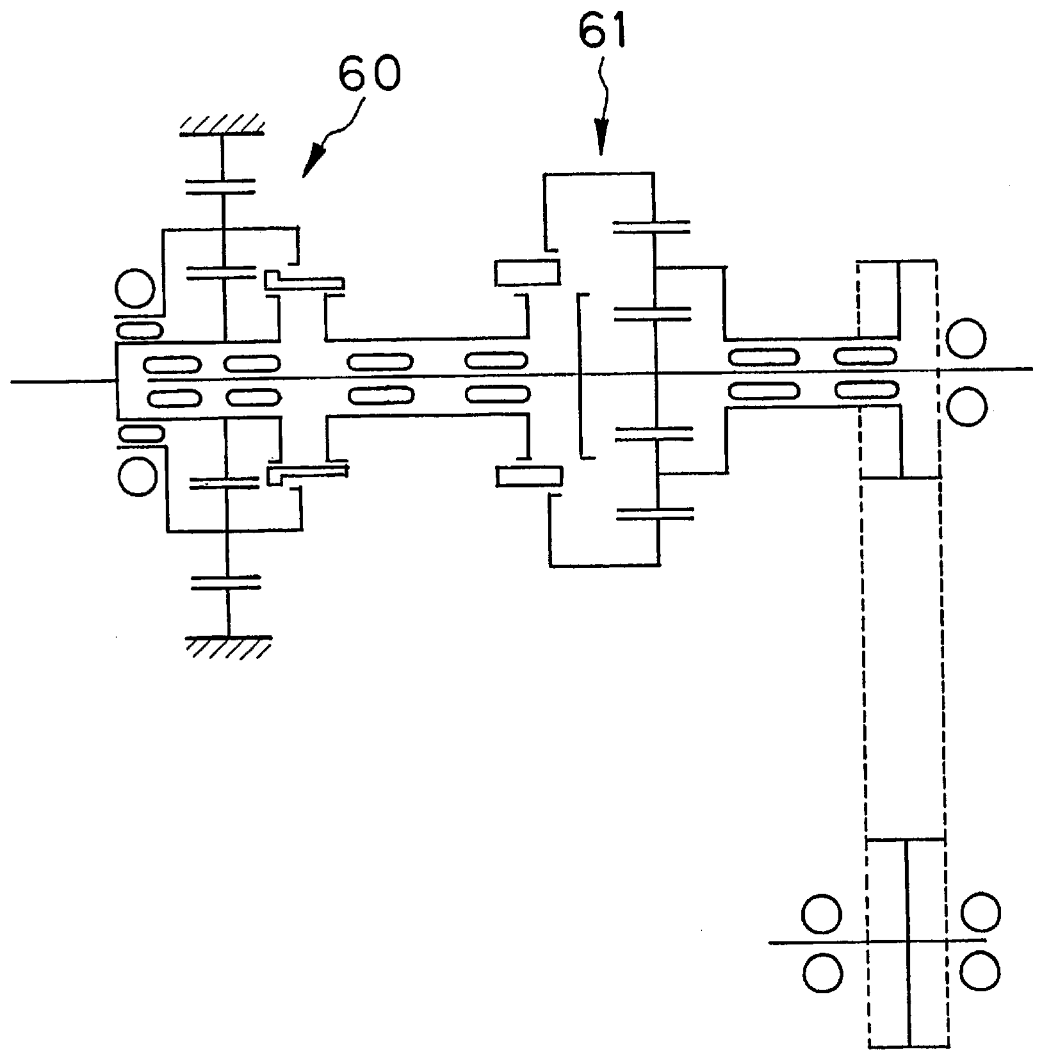
FIG. 6 is a gear train diagram showing a transfer for a four-wheel drive vehicle according to the prior art.

FIG. 5 is a gear train diagram showing the principal components of a transfer according to the second embodiment of the present invention. In this embodiment, the second pinion p2 has an axial length greater than that of the first pinion p1 and has teeth at both axial ends thereof that are spaced apart from each other in the axial direction. The second end of the second pinion p2 is capable of being meshed with the sun gear s1, and the first end of the second pinion p2 extends toward the left side in FIG. 5 (i.e., toward the side of the main transmission). The first pinion p1 and the first end of the second pinion p2 are in mesh at all times on the side of the main transmission.

The present invention is advantageous in that is provides a transfer of a simplified structure, light weight and low cost.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A transfer for a four-wheel drive vehicle, comprising:
- an input shaft;
- a first output shaft disposed coaxially with respect to said input shaft;
- a ring gear which co-rotates with said input shaft;
- a first pinion meshed with said ring gear;
- a second pinion in mesh with said first pinion at all times;
- a carrier, which co-rotates with said first output shaft, for axially supporting said first and second pinions;
- a sun gear, which is shifted axially of said first output shaft, for being selectively meshed with said first pinion or said second pinion;
- locking/unlocking means for locking said sun gear against movement; and
- a second output shaft, which is disposed in parallel with said first output shaft, for selectively transferring torque from said first output shaft or said sun gear.

2. The transfer as defined in claim 1, further comprising a driving gear disposed rotatably in unison with or relative to said first output shaft, and synchronizing means for causing said driving gear to co-rotate with said sun gear or said first output shaft.

3. A transfer for a four-wheel drive vehicle, comprising:
- an input shaft;
- a first output shaft disposed coaxially with respect to said input shaft;
- a ring gear which co-rotates with said input shaft;
- a first pinion meshed with said ring gear;
- a second pinion in mesh with said first pinion at all times;
- a carrier rotatably supporting said first and second pinions;
- a sun gear, which extends axially of said first output shaft, for having one end thereof selectively meshed with said first pinion or said second pinion by said sun gear being slid axially of said first output shaft in response to an applied operation;
- a brake capable of locking a second end of said sun gear when the first end of said sun gear is at a position where it will mesh with said first pinion;
- a driving gear for meshing with the second end of said sun gear when the first end of said sun gear is at a position where it will mesh with said second pinion;
- a sleeve mounted on said first output shaft so as to be capable of engaging with said first output shaft in a direction of rotation and of being shifted along said first output shaft axially thereof, said sleeve being shiftable so that said driving gear can be engaged with said first output shaft in the direction of rotation;
- a second output shaft disposed in parallel with said first output shaft;
- a driven gear, which is provided on said second output shaft so as to co-rotate therewith, for having power transmitted thereto from said driving gear.

4. The transfer according to claim 3, wherein when said transfer is in a high position, said sun gear is meshed with said second pinion and said driving gear, whereby torque is transmitted to said driving gear via said sun gear, and thence to said second output shaft; and when said transfer is in a low position, said sun gear is meshed with said first pinion and is fixed by said brake, and said driving gear is engaged with said first output shaft in the direction of rotation, whereby torque is transmitted to said driving gear via said first output shaft, and thence to said second output shaft.

5. The transfer according to claim 4, wherein when the transfer is in the high position, said driving gear is engaged with said first output shaft in the direction of rotation, whereby said first and second output shafts can be placed in a directly connected state.

6. A transfer for a four-wheel drive vehicle, comprising:

an input shaft;

a first output shaft disposed coaxially with respect to said input shaft;

a ring gear which co-rotates with said input shaft;

a first pinion meshed with said ring gear;

a second pinion in mesh with said first pinion at all times;

a carrier, which co-rotates with said first output shaft, for axially supporting said first and second pinions;

a sun gear, which is shifted axially of said first output shaft, for being selectively meshed with said first pinion or said second pinion;

a locking/unlocking unit locking said sun gear against movement;

a second output shaft, which is disposed in parallel with said first output shaft, for selectively transferring torque to said first output shaft or said sun gear, a driving gear disposed on said first output shaft rotatably in unison with or relative to said first output shaft, said driving shaft transmitting torque to said second output shaft; and synchronizing means for cousing said driving gear to co-rotate with said sun gear or said first output shaft.

7. The transfer as defined in claim 1, wherein said first pinion axially extends to provide gear teeth to an extent that allows the gear teeth mesh with said sun gear and said second pinion.

8. The transfer as defined in claim 3, wherein said first pinion axially extends to provide gear teeth to an extent that allows the gear teeth mesh with said sun gear and said second pinion.

9. The transfer as defined in claim 1, wherein said second pinion axially extends to provide gear teeth to an extent that allows the gear teeth to mesh with said sun gear and said first pinion.

10. The transfer as defined in claim 3, wherein said second pinion axially extends to provide gear teeth to an extent that allows the gear teeth to mesh with said sun gear and said first pinion.

11. The transfer as defined in claim 1, wherein said locking/unlocking means locks said sun gear when said sun gear meshes with the first pinion and unmeshed from the second pinion.

12. The transfer as defined in claim 2, wherein said locking/unlocking means locks said sun gear when said sun gear meshes with the first pinion and unmeshed from the second pinion.

13. The transfer as defined in claim 2, wherein said synchronizing means causes said driving gear to co-rotate with said first output shaft when said sun gear meshes with the first pinion, and causes said driving gear to co-rotate with said sun gear when said sun gear meshes with the second pinion.

* * * * *